(12) United States Patent
Dalmatov

(10) Patent No.: US 11,467,751 B2
(45) Date of Patent: Oct. 11, 2022

(54) MIGATION OF DATA PORTIONS BETWEEN DIFFERENT SIZED SLICES IN THE SAME OF DIFFERENT PERFORMANCE TIER

(71) Applicant: EMC IP Holding Company LLC, Hopkinton, MA (US)

(72) Inventor: Nickolay Dalmatov, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/110,466

(22) Filed: Dec. 3, 2020

(65) Prior Publication Data

US 2021/0286542 A1   Sep. 16, 2021

(30) Foreign Application Priority Data

Mar. 13, 2020  (RU) .......................... RU2020110706

(51) Int. Cl.
*G06F 3/06* (2006.01)
(52) U.S. Cl.
CPC ............ *G06F 3/0647* (2013.01); *G06F 3/061* (2013.01); *G06F 3/0685* (2013.01)

(58) Field of Classification Search
CPC ......... G06F 3/0647–0649; G06F 3/061; G06F 3/0685
See application file for complete search history.

(56) References Cited

U.S. PATENT DOCUMENTS

| 9,542,326 | B1* | 1/2017 | Throop | G06F 3/0649 |
|---|---|---|---|---|
| 9,916,090 | B1* | 3/2018 | Can | G06F 3/0685 |
| 2014/0289451 | A1* | 9/2014 | Ho | G06F 12/0246 711/103 |
| 2018/0136838 | A1* | 5/2018 | White | G06F 3/0647 |

* cited by examiner

*Primary Examiner* — Chie Yew
(74) *Attorney, Agent, or Firm* — Muirhead and Saturnelli, LLC

(57) ABSTRACT

Techniques for data placement may include receiving data portions stored at logical addresses, and storing the data portions on slices of physical storage located in storage tiers. The storage tiers may include different size slices on the different tiers. In one embodiment, slices in the same tier are all the same size. In another embodiment, slices in the same tier may be of different sizes. Slices of data may be demoted and promoted among the storage tiers as the workloads of the slices changes over time. Demotion may include combining slices into a larger slice. Promotion may include partitioning a slice into smaller slices. Additionally, multiple slices of a tier may be combined into a larger slice in the tier. A slice in the tier may be partitioned into multiple smaller slices also located in the tier.

18 Claims, 8 Drawing Sheets

| Slice ID 402 | Statistics 404 | |
| --- | --- | --- |
| | Write I/O activity 406 | Read I/O activity 408 |
| ID1 | X1 Write I/Os per second | Y1 Read I/Os per second |
| ID2 | X2 Write I/Os per second | Y2 Read I/Os per second |
| .. | .. | .. |

MIGATION OF DATA PORTIONS BETWEEN DIFFERENT SIZED SLICES IN THE SAME OF DIFFERENT PERFORMANCE TIER

BACKGROUND

Technical Field

This application generally relates to data storage.

Description of Related Art

Systems may include different resources used by one or more host processors. The resources and the host processors in the system may be interconnected by one or more communication connections, such as network connections. These resources may include, for example, data storage devices such as those included in data storage systems. These data storage systems may be coupled to the one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical storage entities, such as files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for data placement comprising: receiving a plurality of data portions stored at a plurality of logical addresses; and storing the plurality of data portions on a plurality of slices of physical storage located in a plurality of storage tiers, wherein the plurality of slices include a first slice of a first storage tier of the plurality of storage tiers and a second slice of a second storage tier of the plurality of storage tiers, wherein the second storage tier is different than the first storage tier and wherein the first slice is a first size and the second slice is a second size that is different than the first size.

In at least one embodiment, the processing may include: receiving a plurality of I/O operations directed to the plurality of slices of physical storage located in the plurality of storage tiers; determining, in accordance with the plurality of I/O operations, a plurality of sets of one or more I/O workload statistics for the plurality of slices, wherein each of the plurality of slices has an I/O workload characterized by a corresponding one of the plurality of sets of one or more I/O workload statistics; and determining, in accordance with the plurality of sets of one or more I/O workload statistics, a first data movement for a first data portion of the plurality of data portions wherein the first data portion is stored on the first slice of the first storage tier. The first data movement may include relocating the first data portion from the first slice of the first storage tier to the second storage tier. The first data movement may include demoting the first data portion from the first slice of the first storage tier to the second slice of the second storage tier, and wherein the first storage tier may be a higher performance storage tier than the second storage tier. The processing may further include combining the first data portion of the first slice with one or more additional data portions stored on one or more additional slices of the first storage tier; and relocating the first data portion of the first slice and the one or more additional data portions of the one or more additional slices of the first storage tier to the second slice of the second storage tier, wherein the second size of the second slice is larger than the first size of the first slice. The second size of the second slice may be equal to a sum of the first size of the first slice and a size of each of the one or more additional slices.

In at least one embodiment, the first data movement may include promoting the first data portion from the first slice of the first storage tier to the second storage tier, and wherein the first storage tier may be a lower performance storage tier than the second storage tier. Processing may include partitioning the first data portion of the first slice into a plurality of data partitions; and relocating each of the plurality of data partitions into a different one of a second plurality of slices in the second storage tier. A size of each slice in the second plurality of slices may be smaller than the first size of the first slice. Each slice in the second plurality of slices may be a same size. A sum of sizes of the second plurality of slices may be equal to the first size of the first slice.

In at least one embodiment, a first data portion of the plurality of data portions may be stored on the first slice of the first storage tier. Processing may include forming a new slice in the first storage tier by combining the first slice of the first storage tier with one or more additional slices of the first storage tier. The first storage tier may be a lowest performance tier of the plurality of storage tiers, and wherein I/O workloads of the first slice and the one or more additional slices may be below a specified minimum threshold.

In at least one embodiment, a first data portion of the plurality of data portions may be stored on the first slice of the first storage tier. Processing may include partitioning the first slice into a second plurality of slices of the first storage tier. The first storage tier may be a highest performance tier of the plurality of storage tiers. The plurality of slices may be a plurality of different sizes, wherein each of the plurality of storage tiers may include slices of a same one of the plurality of different sizes. The plurality of slices may be a plurality of different sizes and wherein at least a first of the plurality of storage tiers may include two different sized slices.

BRIEF DESCRIPTION OF THE DRAWINGS

Features and advantages of the present invention will become more apparent from the following detailed description of exemplary embodiments thereof taken in conjunction with the accompanying drawings in which:

FIG. 5 is a table of statistics that may be collected for the slices in an embodiment in accordance with the techniques herein.

DETAILED DESCRIPTION OF EMBODIMENT(S)

Figure 1:
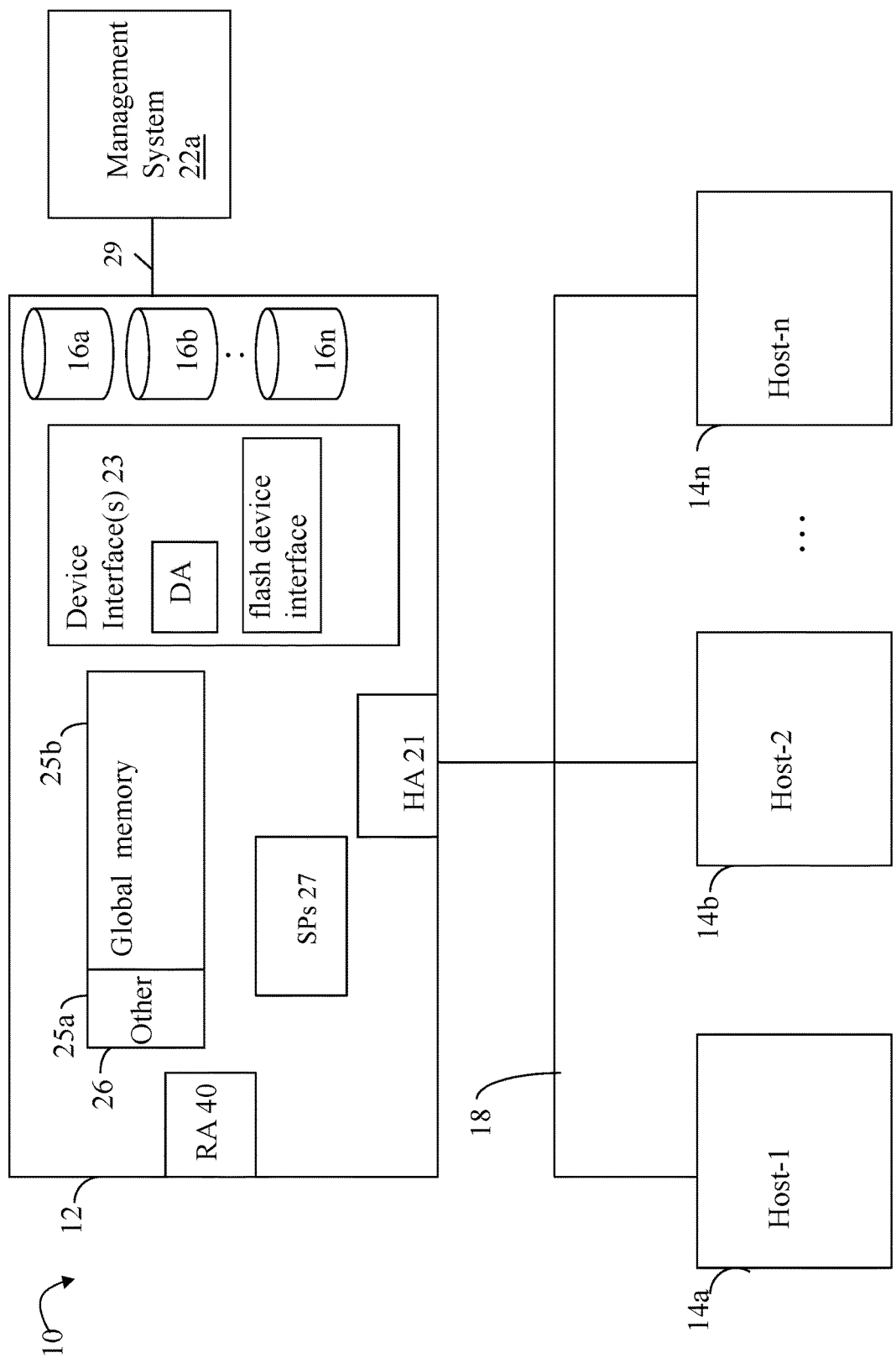
FIG. 1 is an example of components that may be included in a system in accordance with the techniques described herein.

Referring to FIG. 1, shown is an example of an embodiment of a system that may be used in connection with performing the techniques described herein. The system 10 includes a data storage system 12 connected to host systems 14a-14n through communication medium 18. The hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of physical data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. The SSDs may refer to solid state electronics devices as distinguished from electromechanical devices, such as hard drives, having moving parts. Flash devices or flash memory-based SSDs are one type of a SSD that contains no moving mechanical parts. For example, at least some of the flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers) used to interface with the flash drives and/or other non-volatile physical data storage devices 16a-n. The DAs may also be characterized as back end components of the data storage system which interface with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use by the one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as the HA 21, a DA or disk interface, an RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and a logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, the element 12 of FIG. 1 may be a data storage system that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Generally, techniques herein may be used in connection with any suitable storage system, appliance, device, and the like, in which data is stored.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on the management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for a snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that the user I/O commands are never issued over such a physical connection 29 provided solely for purposes of connecting the management system to the data storage system. In any case, the data path and control path each define two separate logical flow paths.

In connection with a data storage system such as described herein, an I/O request may be a read request to read data. The read request may be received at the data storage system at a port of a front-end component of the data storage system (such as one of the HAs as described elsewhere herein). In terms of processing a read request, a determination may be made as to whether all the requested read data is in the cache (e.g., a cache hit where read data is stored in data cache). If so, the read request may be characterized as a read hit. In such cases of a read hit, the front-end component, such as the HA, receiving the read request may service the read request by retrieving all requested read data from the cache and returning the requested read data to the host. If all the requested read data is not in the cache, the read may be characterized as a read miss (e.g., cache miss) whereby processing is performed to retrieve from physical storage any portion of the requested data that is not currently in the cache. As described above, one or more DAs may perform processing to retrieve from physical storage any portion of the requested data not currently in the cache. Once all the requested read data is in cache, the front-end component, such as the HA, receiving the read request may service the read request by retrieving all requested read data from the cache and returning the requested read data to the host. In this manner, a front-end component may service read requests using data that is already stored in the cache prior to processing the read request, as well as using data that is brought into the cache from physical storage responsive to receiving the read request.

In connection with write operations, write data received at the data storage system may be stored in the cache and then written out later to physical storage, such as written to backend physical storage devices (PDs) by a DA. Once the write data is written into the cache, the data may be marked as write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical non-volatile storage of the back end PDs. Once the write data is written to the cache, the data storage system may send an acknowledgement to the host that the write operation has been completed even though the write data may not have yet been destaged from the cache to the backend physical storage devices. Once the WP data has been destaged from the cache to physical storage, the cache location including the write data may be characterized as clean where the cache location is valid and contains a copy of write data that has been synchronized with backend physical storage.

Although not illustrated in FIG. 1 for simplicity and as known by those of ordinary skill in the art, an embodiment may store additional information for cached data, such as read and write data described above that may be stored in the data cache. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache to retrieve and/or store data from the cache. For example, the HA may manage and/or use cache mapping information that maps a LUN and LUN offset to a cache location including data stored at the LUN offset on the particular LUN. The DA may manage and/or use cache mapping information mapping a PD and offset on the PD to a cache location including data stored at the offset on the particular PD for use in destaging write data from cache to backend non-volatile PDs 16a-n.

Data storage systems may include different storage tiers having different types of non-volatile storage media used as the backend PDs for data storage. For example, as noted above, in at least one embodiment, the data storage system may include one or more tiers of rotating disk drives and include one or more tiers of SSD drives (e.g., flash-based storage drives). Data portions mapped to various logical addresses of LUNs may be proactively moved or relocated between different storage tiers. For example, consider a multi-tiered storage system with 3 storage tiers—an SSD tier of flash-based drive, a tier of 15K RPM rotating disk drives and a tier of 10K RPM rotating disk drives. The foregoing 3 storage tiers may be ranked based on performance where the SSD tier may be ranked as the highest, the tier of 15K RPM drives ranked second highest and the tier of 10K RPM drives ranked lowest/least in terms of performance. A data portion, such as mapped to a subrange of a LUN logical address space, may be relocated between different ones of the foregoing 3 tiers in an automated fashion based on the temperature or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10K or 15K RPM tier. At yet a third point in time subsequent to the second point in time, the data portion may be frequently accessed again and may be promoted to a higher performing tier (e.g., relocated from the 10K or 15K RPM tier to the SSD tier). Generally, promotion may refer to movement of data from a lower performance storage tier to a higher performance storage tier; and demotion may refer to movement of data from a higher performance storage tier to a lower performance storage tier.

Figure 2:
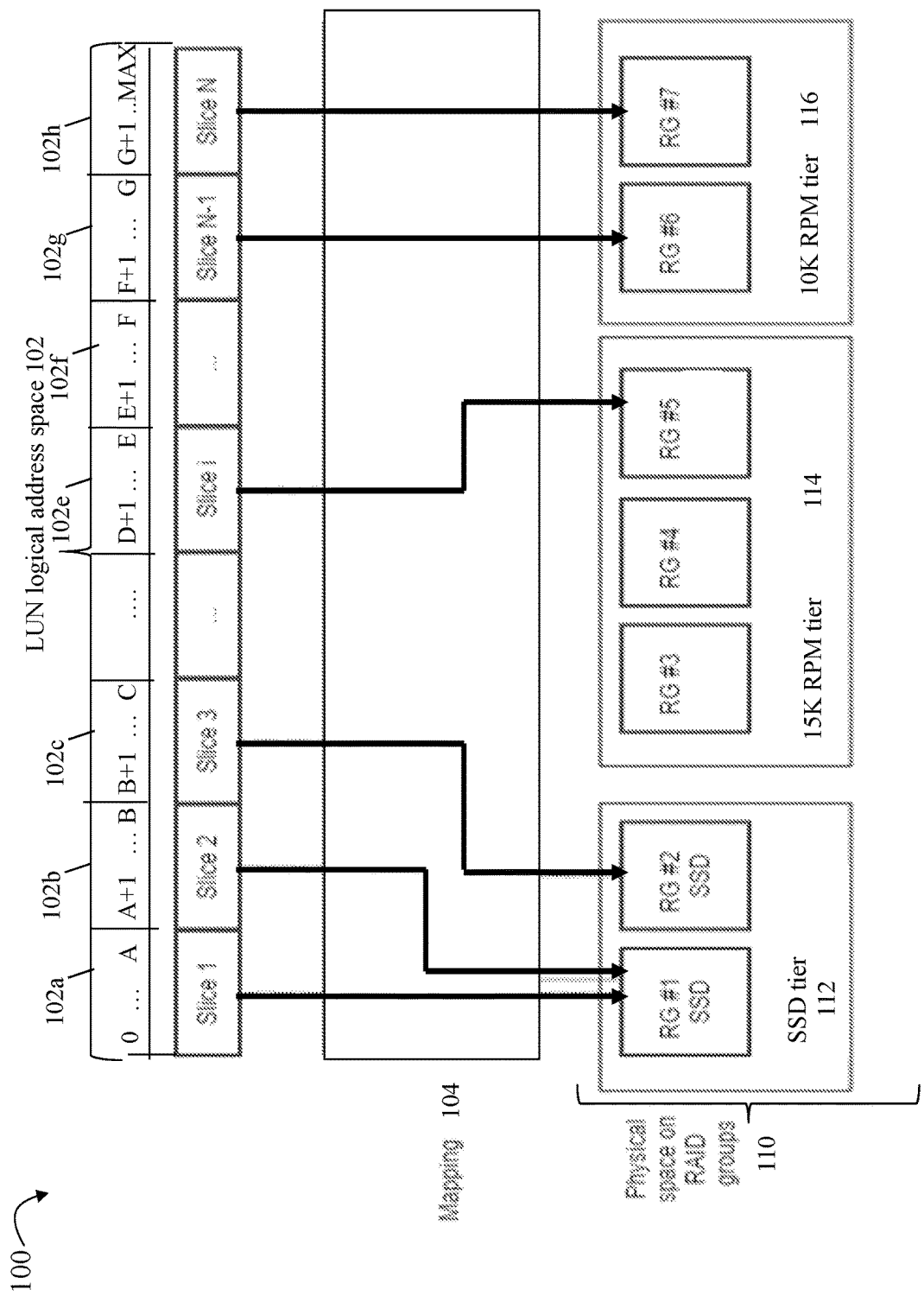
FIG. 2 is an example illustrating logical to physical mapping that may be used in an embodiment in accordance with the techniques herein.

Referring to FIG. 2, shown is an example illustrating logical to physical mapping in a data storage system in an embodiment in accordance with the techniques herein. The example 100 illustrates how the logical address space or range of a LUN 102 is mapped via mapping layer 104 to different slices, segments or more generally, portions of physical memory of non-volatile physical storage devices (110) providing back-end data storage, such as denoted by PDs 16a-n in FIG. 1. The example 100 include storage tiers 112 (SSD tier), 114 (15K RPM tier) and 116 (10K RPM tier) comprising the PDs 110 as noted above. Element 102 may denote the LUN's logical address space, having a starting logical address, block or offset of 0, and an ending maximum logical address, MAX. The LUN's logical address space 102 in the example 100 is partitioned into equal logical address space portions (denoted by 102a-h) where each of the portions 102a-h is mapped to region of physical storage, also referred to as slices or segments, on the different PDs of different ones of the storage tiers of 110. As noted above, data storage system software may periodically remap portions of the LUN's logical address space to keep the most actively used or accessed portions of 102a-n on slices of the highest performance tier 112 in efforts to maximum data storage system I/O performance. As shown in FIG. 2, PDs of the tiers 112, 114 and 116 may be configured into RAID groups (denoted as RG #1-7 in FIG. 2) each having a suitable RAID level to provide data protection.

In at least one embodiment, a LUN may a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN. With a thin LUN, the physical storage for the LUN may be allocated in chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to.

In at least one embodiment, the data storage system may include multiple tiers of PDs as described herein. Each tier may include PDs of the same media type. Also consistent with other discussion herein, the multiple tiers may have a performance ranking, from highest performance to lowest performance, depending on the particular characteristics of the PDs in each tier. For example, an embodiment may include 3 tiers—tier 1 being the highest performance tier of flash-based storage devices; tier 2 being a mid level performance tier of 15K RPM PDs; and tier 3 being a lowest level performance tier of 10K RPM PDs. In at least one embodiment, a data storage optimizer may be used to automatically and dynamically relocate data portions, such as slices of data, between different ones of the storage tiers depending on the I/O workload or activity of the data portions over time. For example, the data storage optimizer may be the Fully Automated Storage Tiering (FAST) software by Dell EMC. The data storage optimizer may relocate data portions among the different tiers at various times in attempts to improve and optimize data storage system and I/O performance. For example, the data storage optimizer may store the data portions having the highest I/O workloads (e.g., highest activity, temperature or frequency of access) on the highest performance tier(s). Data portions that have low or idle I/O workloads (e.g., lowest activity, temperature or frequency of access) may be relocated to the lowest performance tier. The data portions may be automatically relocated by the data storage optimizer among the different tiers as their associated I/O workloads change over time.

In some existing data storage systems, the size of a slice is fixed and the size of each slice is the same, such as 256 megabytes (MBs). In some existing systems, the size of a slice may be the data movement granularity size denoting the size of each data portion that is relocated or moved, such as by the data storage optimizer.

In some existing systems, various statistics may be tracked for each slice. Such statistics may be used to characterize the I/O workload, activity or access frequency of the data of each slice, for example, in order to determine when to promote or demote data in each slice as well as to select a particular target tier for any desired promotion or demotion. The statistics may be maintained in a memory, such as a portion of a fast volatile memory such as a cache, in order to have quick access to the statistics since the statistics for a slice are typically updated with each I/O operation directed to a logical address that is mapped to the slice.

Generally, the smaller the size of each slice used in connection with automated storage tiering performed by a data storage optimizer, the more efficient the use of the physical storage. For example, all of the data stored in a single slice may be moved or relocated as a single unit. However, it may be that all the I/O activity or data accesses captured by the statistics for the slice is actually due to a very small subset of the data located in the slice. For example, for a 256 MB slice, all the I/O activity may be directed to only 1 MB of the slice data. However, in existing systems, the entire 256 MB slice of data is promoted and demoted as a whole. In other words, in such existing systems, there is no movement of data in terms of automatic relocation for promotion or demotion by the data storage optimizer based on a sub-slice size. Thus it may be desirable to use a small slice size in a system for automated storage tiering. However, with the smaller slice sizes of physical storage, the total number of slices increases and therefore the amount of memory consumed to store the per slice statistics also increases.

Described herein are techniques that may be used in an embodiment in which the automated storage tiering and data relocation among the different storage tiers is performed by a data storage optimizer. The techniques provide for multiple different size slices used in connection with the dynamic and automated movement of data among the different storage tiers in accordance with the changing I/O workload, activity, or access frequency of the slices of data. In at least one embodiment, different size slices for automated storage tiering and data relocation may be used for the different storage tiers. For example, for a system having 3 storage tiers, the highest ranked performance storage tier may have the smallest slice size of the 3 storage tiers. and the lowest ranked storage tier may have the largest slice size of the 3 storage tiers. In at least one embodiment, the total number of slices among all the storage tiers may be constant although the sizes of the slices in the different storage tiers may vary.

In at least one embodiment, multiple slices of data stored on a source storage tier may be demoted to a lower performance storage tier by combining the multiple slices of data into a single larger slice in the lower performance storage tier. For example, 4 slices stored in an SSD tier may be combined into a single larger slice of a non-SSD tier.

In at least one embodiment, a single slice of data on a source storage tier may be promoted to a higher performance storage tier where the single slice of the source tier is further partitioned into multiple smaller size slices of the higher performance storage tier. For example, a single slice of data stored in a non-SSD tier may be divided into 4 smaller sized slices of an SSD tier.

Generally, any one or more statistics may be used to measure the I/O workload, activity or access frequency of the slices of data. For example, in at least one embodiment, the one or more statistics maintained for each slice may be based on reads and/or writes to data of each slice. In at least one embodiment, the statistics for a slice may include at least one write I/O workload or activity statistic for the slice. In at least one embodiment, the statistics for a slice may include at least one read I/O workload or activity statistic for the slice. In at least one embodiment, the statistics for a slice may include both at least one read I/O workload or activity statistic for the slice and at least one write I/O workload or activity statistic for the slice. In at least one embodiment, the statistics for the slice may include at least one statistic determined in accordance with both the read I/O workload or activity of the slice and the write I/O workload of the slice.

In at least one embodiment, placement of a data portion on a slice in a particular one of the multiple storage tiers may consider the I/O workload or activity characteristics of the data portion and the characteristics of the storage tier. As described elsewhere herein, in at least one embodiment, data portions having the highest workloads or activity levels may generally be placed in the highest performance tiers. As another example, whether the I/O workload is write heavy or read heavy may be used in selecting a particular storage tier having a particular RAID level. To further illustrate, in at least one embodiment, the PDs in each tier may be configured into RAID groups of any suitable RAID level. For example, in at least one embodiment, the PDs in at least one of the tiers may be configured into RAID-5 level RAID groups and the PDs in at least a second of the tiers may be configured into RAID-6 level RAID groups. The amount of system resources used to store data to a physical storage location on a backend PD may vary with the particular RAID group level and configuration. Different RAID levels, such as RAID-5 and RAID-6 incur an additional penalty when writing data to a physical location in the RAID group. RAID-6 provides block-level striping with double distributed parity. RAID-5 provides block-level striping with distributed parity. The penalty in terms of extra reads and writes incurred when writing to a RAID group is less for a RAID-5 group than a RAID-6 group. For example, RAID-6 algorithms may have double parity information such that writing data to a storage location in a RAID-6 RAID group may incur an additional penalty. For example, each write operation that writes to a storage location in a RAID-6 RAID group requires reading the data, reading the first parity, reading the second parity, writing the data, writing the first parity and then finally writing the second parity. RAID-6 can tolerate up to 2 drive member failures. RAID-5 incurs less of a write performance penalty than RAID-6 but can tolerate a single drive member failure. Thus, storing data in a RAID-6 group provides a higher level of data protection than a RAID-5 group. However, the write penalty due to the additional processing required to write to a RAID-6 RAID group for data expected to be frequently rewritten may be undesirable. As a result, the current I/O activity level or workload of a data portion may be used in selecting a RAID group from which to allocate physical storage to store the data portion. The foregoing is based on the assumption that the current I/O activity level or workload of a data portion for a current time period denotes the expected workload for the data portion in the next time period. If the write I/O activity level or workload for a data portion is high (e.g., above a specified threshold) or write heavy (e.g., more writes than reads in the I/O workload mixture), the data portion may be located on a slice of physical storage in a storage tier configured into RAID-5 groups rather than RAID-6 groups in order to reduce the write penalty. In contrast, for a data portion that has low write I/O activity level or workload and thus has a high read I/O activity level or workload (e.g., above a specified threshold) or is read heavy (e.g., more reads than writes in the I/O workload mixture), processing may store the data portion on a slice of physical storage in a storage tier configured into either RAID-5 groups or RAID-6 groups since the data portion has an expected low probability of being rewritten.

As another example, whether the I/O workload is write heavy or read heavy may be used in selecting a particular storage tier based on the physical media type of the PDs in the tier. To further illustrate, consider an embodiment having two SSD tiers—SSD tier1 including MLC PDs and SSD tier 2 including SLC PDs. Generally, MLC PDs may not be preferred for write heavy I/O workloads and may be preferred for read heavy I/O workloads. SLC PDs may be preferred for either read heavy or write heavy I/O workloads. In such an embodiment, I/O workload characteristics of a data portion may denote whether the data portion's workload is read heavy or write heavy. For a data portion having a write heavy workload, it may be preferred to place the data portion on a slice in the SSD tier 2 rather than the SSD tier 1. For a data portion having a read heavy workload, the data portion may be placed on a slice in either the SSD tier 1 or SSD tier 2. Thus, a particular tier may be selected for placement of a data portion based on a match between a workload preference of the particular tier's PDs and the data portion's workload characteristic of read heavy or write heavy.

The foregoing and other aspects of the techniques herein are more fully described in more detail in the following paragraphs.

Examples described in the following paragraphs illustrate use of the techniques herein with particular slice sizes, number of storage tiers, number of slices, and the like. However, such particulars should not be construed as a limitation of the techniques herein which may generally be used in connection with any suitable slice sizes, number of storage tiers, and the like.

Figure 3:
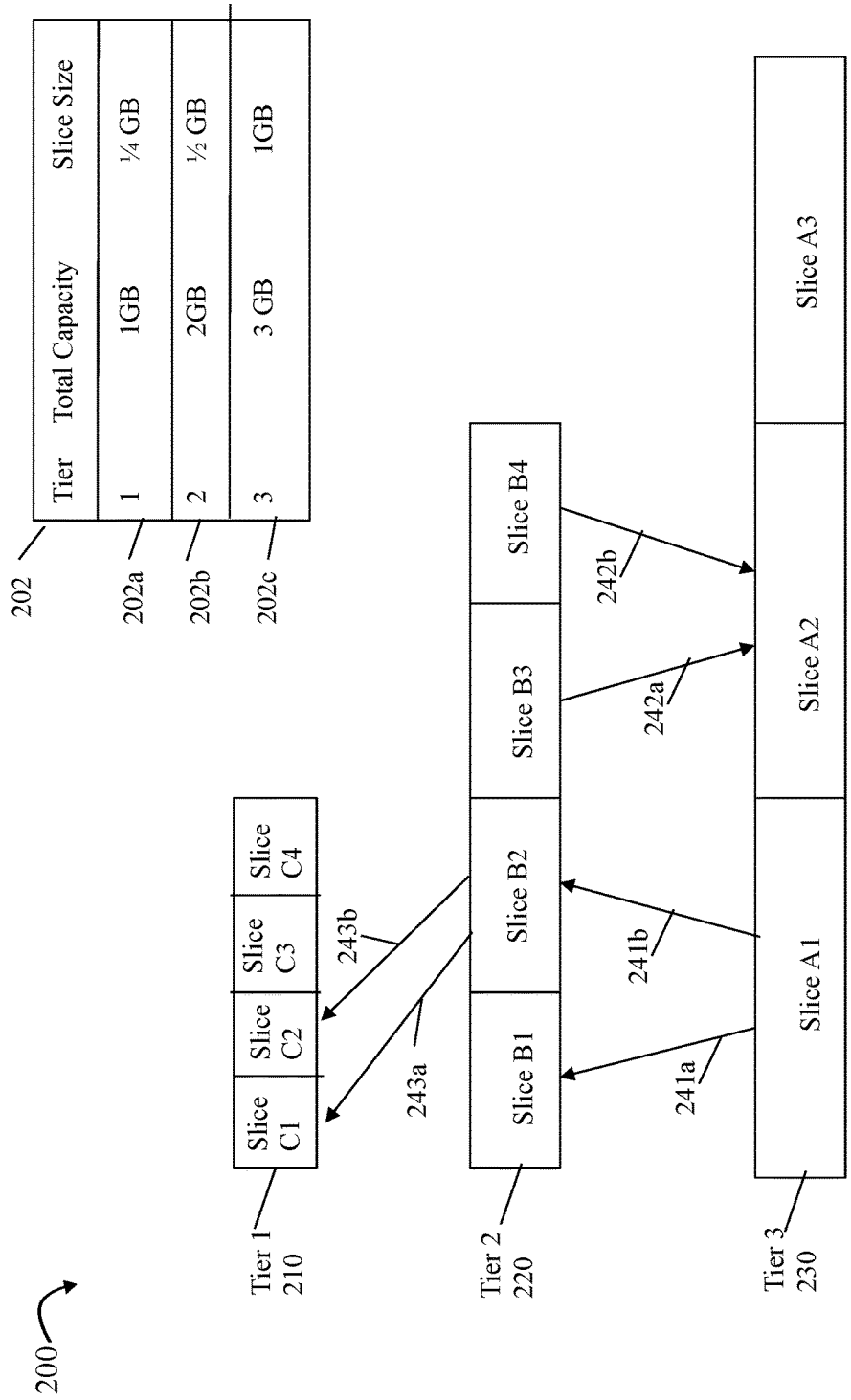
FIGS. 3, 4A, 4B and 4C are examples illustrating various embodiments of the techniques herein.

What will now be described in connection with FIG. 3 is an embodiment including 3 storage tiers—tier 1 of flash PDs, tier 2 of 15K RPM PDs, and tier 3 of 10K RPM PDs. Thus, the 3 tiers may be ranked, in terms of highest performance to lowest performance, tier 1, tier 2, and tier 3. In this embodiment, a different slice size is specified for each tier. All slices in the same tier are the same size. The size of slices in each tier decreases as the performance ranking of the tier increases. In at least one embodiment, when promoting a slice from a source tier to a higher performance target tier, the slice may be partitioned into a number of smaller size slices of the target tier. In at least one embodiment, when demoting a slice from a source tier to a lower performance target tier, the slice may be combined with one or more additional slices of the source tier where the resulting combination of slices of the source tier form a larger target slice in the target tier.

In at least one embodiment, processing may be performed to collect statistics regarding the I/O workload or activity levels of the slices for a time period. Subsequently, a data storage optimizer or other component may then use the collected statistics to determine in what particular storage tier to place the data portions of the slices. The processing may include determining whether to perform any data movements such as promotion or demotion of data located in a slice of a particular storage tier. In a repetitive continual manner, an embodiment may collect statistics for a time period and then use the collected statistics for the time period to determine whether to perform any data movements. More generally, an embodiment may perform such processing as just described upon the occurrence of a trigger condition, such as at each occurrence of a defined time period. An embodiment may also define other suitable trigger conditions that may result in the data storage optimizer performing processing that uses the collected statistics to determine where to place the data portions of the slices. For example, an embodiment may perform processing to determine in what tier to place the data portions of the slices, possibly resulting in data promotions and/or demotions, on demand. In at least one embodiment, an on demand request may be a user request issued using a user interface (UI) of a data storage system management application, a command line interface (CLI), and the like.

Referring to FIG. 3, shown is an example illustrating use of the techniques herein in at least one embodiment. In the example 200, there are 3 storage tiers—tier 1 210, tier 2 220 and tier 3 230. The tiers of FIG. 3 may be as just described above. The table 202 lists the different tiers, tier capacities, and slice sizes of each tier. The row 202a indicates that tier 1 210 has a total capacity of 1 GB and a slice size of ¼ GB. The row 202b indicates that tier 2 220 has a total capacity of 2 GB and a slice size of ½ GB. The row 202c indicates that tier 3 230 has a total capacity of 3 GB and a slice size of 1 GB. As illustrated in FIG. 3, tier 3 230 includes 3 slices, 1 GB each; tier 2 220 includes 4 slices, ½ GB each; and tier 1 210 includes 4 slices, ¼ GB each.

Different promotion thresholds may be associated with promoting a slice of data to tier 1 210 and tier 2 220. In at least one embodiment, in order for a slice to be promoted to tier 1 210 from one of the lower performance tiers, the slice's I/O workload or activity level must exceed a tier 1 promotion threshold level; and in order for a slice to be promoted to tier 2 220, the slice's I/O workload or activity level must exceed a tier 2 promotion threshold level, wherein the tier 1 promotion threshold>tier 2 promotion threshold.

Different demotion thresholds may be associated with demoting a slice of data to tier 2 220 and tier 3 230. In at least one embodiment, in order for a slice to be demoted to tier 2 220 from tier 1 210, the slice's I/O workload or activity level must fall below a tier 2 demotion threshold level; and in order for a slice to be demoted to tier 3 230 from a higher performance tier (e.g., tier 1 210 or tier 2 220), the slice's I/O workload or activity level must fall below a tier 3 demotion threshold level.

The foregoing promotion and demotion thresholds may be any suitable values and may be determined in any suitable manner.

At a first point in time T1, assume that statistics have been collected for each of the slices in the 3 tiers 210, 220 and 230 that include data. For example, assume that at least slices A1, B3, B4 include data portions stored therein and statistics have been collected for each of these slices characterizing the I/O workload or activity of the slices.

The statistics for slice A1 may indicate that the I/O workload or activity level of slice A1 exceeds the tier 2 promotion threshold level of activity but not the tier 1 promotion threshold level. In this case, slice A1 may be promoted from tier 3 230 to tier 2 220. Promotion processing may include partitioning the slice A1 into the 2 slices, B1 and B2, of tier 2. Generally, the source slice A1 is partitioned into 2 or more slices of the target tier 2 depending on the size of each slice in tier 2. In this example 200, slice A1 is 1 GB in size and, as part of promoting the slice A1, the slice A1 is partitioned into 2 smaller slices, where each such smaller slice has a size of ½ GB. As a variation, if slice A1 is promoted to tier 1, slice A1 is partitioned into 4 smaller slices, each of which is ¼ GB in size. The arrows 241a, 241b denote the partitioning of slice A1 into 2 portions and promoting and relocating the data of each of the 2 portions into the smaller slices B1 and B2 in tier 2 220.

Also at the first point in time T1, the statistics of slices B3 and B4 indicate that the I/O workload or activity level of each of B3 and B4 fall below the tier 3 demotion threshold. As a result, processing is performed to demote both the slices B3 and B4 from tier 2 to tier 3. In connection with the techniques herein, demotion processing may include combining a number of slices from tier 2 to form a new slice in tier 3. In at least one embodiment, the number of slices from tier 2 that are combined has a resulting size equal to the specified slice size of tier 3, which in this example is 1 GB (e.g., as indicated by the slice size 1 GB in the row 202c of the table 202). In the example 200, the data of the 2 slices B3 and B4 of the tier 2 are combined into a single slice A2 of tier 3. The arrows 242a, 242b denote the demotion, relocation and combining of the data of the slices B3 and B4 of tier 2 into a single larger slice A2 in tier 3.

Assume now subsequent to T1, a second time period elapses and additional statistics are collected for the slices in the example 200. At a second point in time T2, assume that statistics have been collected for each of the slices in the 3 tiers 210, 220 and 230 that include data. For example, assume that at least slices B1, B2, and A2 include data portions stored therein and statistics have been collected for each of these slices characterizing the I/O workload or activity of the slices. In particular, the I/O workloads for slices B1, B2 and A2 indicate that no change or data movement is needed for data of such slices. However, the I/O workload for slice B2 exceeds the tier 1 promotion threshold level and indicates that slice B2 should be promoted to tier 1. As a result, promotion processing is performed that includes partitioning the slice B2 (e.g., ½ G in size) into 2 smaller slices, each ¼ GB in size. The arrows 243a, 243b denote the partitioning of slice B2 into 2 portions and promoting and relocating the data of each of the 2 portions into the smaller slices C1 and C2 in tier 1 210.

The foregoing may be repeated for subsequent time periods. As a result of partitioning a slice of a source tier into smaller slices of the target tier when promoting the slice from the source tier to the target tier, the statistics may be collected for smaller more refined slices of physical storage in the higher performance target tier. Thus, the I/O workload or activity may be observed for smaller slices of physical storage in the higher performance target tier allowing for further promotion or demotion of the smaller slices in the target tier. For example, as illustrated in the example 200 of FIG. 3, the large slice A1 included 1 GB of data. However, a sub-slice portion of the data of the slice A1 had a higher I/O workload or activity level than the remaining portion of the slice A1. In particular, after 2 time periods as described above, a ½ GB data portion that originated from slice A1 of tier 3 has been promoted from tier 3 to slices C1 and C2 in tier 1.

What will now be described is another embodiment in accordance with the techniques herein in connection with FIGS. 4A-4C. In this embodiment, the techniques are illustrated using the 3 storage tiers as described above. However, in this embodiment, there is no fixed or specified slice size for each tier. Each tier may include multiple slices of the same or different sizes.

Generally, in this embodiment, a single source slice may be partitioned into two or more smaller target slices. In at least one embodiment, the number of target slices may vary with the I/O workload or activity level of the single source slice. As the I/O workload or activity of the source slice increases, the number of target slices may also increase. Additionally, the target slices may be located in the same tier as the source slice or a higher performance tier than the source slice depending on the I/O workload or activity level of the source slice. In this manner, partitioning the source slice into multiple smaller target slices may be performed as part of promotion processing as described above in connection with FIG. 3 but without having a specified slice size for the tiers. Additionally, partitioning the source slice into multiple smaller target slices may be performed even when there is no data promotion of the source slice. In this latter case, the target slices are located in the same tier as the source slice. For example, the source slice of a tier may have a sufficiently high I/O workload or activity level to trigger partitioning the source slice into multiple smaller slices of the same tier. However, the I/O workload or activity level of the source slice of the tier may not be high enough to trigger promotion of the source slice to a higher performance tier.

Generally, in this embodiment, two or more source slices may be combined into a single larger target slice. In at least one embodiment, the number of source slices combined, as well as the particular slices combined, may vary with the I/O workload or activity level of the source slices. Additionally, the target slice may be located in the same tier as the source slices or a lower performance tier than the source slice depending on the I/O workload or activity level of the source slices. In this manner, combining the source slices into a single larger target slice may be performed as part of promotion processing as described above in connection with FIG. 3 but without having a specified slice size for the tiers. Additionally, combining the source slices into a single larger target slice may be performed even when there is no data demotion of the source slices. In this latter case, the source slices are located in the same tier as the larger target slice. For example, the source slices may be located in the lowest performance tier 3 and have a very low (e.g., below a specified minimum threshold) or idle activity level for a specified continuous amount of time. In this case, the source slices may be combined into a single larger target slice in tier 3, the lowest performance tier.

In such an embodiment, MAX, denoting a maximum number of slices in the system may be specified. MAX may denote the maximum number of slices allowable in the aggregate with respect to all the storage tiers, such as all 3 storage tiers in the FIGS. 4A-4C. In such an embodiment, there may be no limit regarding a maximum number of slices allowable for any single tier but the limit MAX with respect to the total number of slices allowable across all tiers. In this manner, MAX sets an upper bound with respect to the amount of storage, such as memory, used to store the sets of slice statistics. In such an embodiment, a minimum slice size, MIN, may be specified denoting the smallest allowable slice size. A single slice may be partitioned into any number of smaller slices where each such smaller slice is not smaller than size MIN. MIN and MAX may be any suitable size and may vary with embodiment.

Figure 4A:
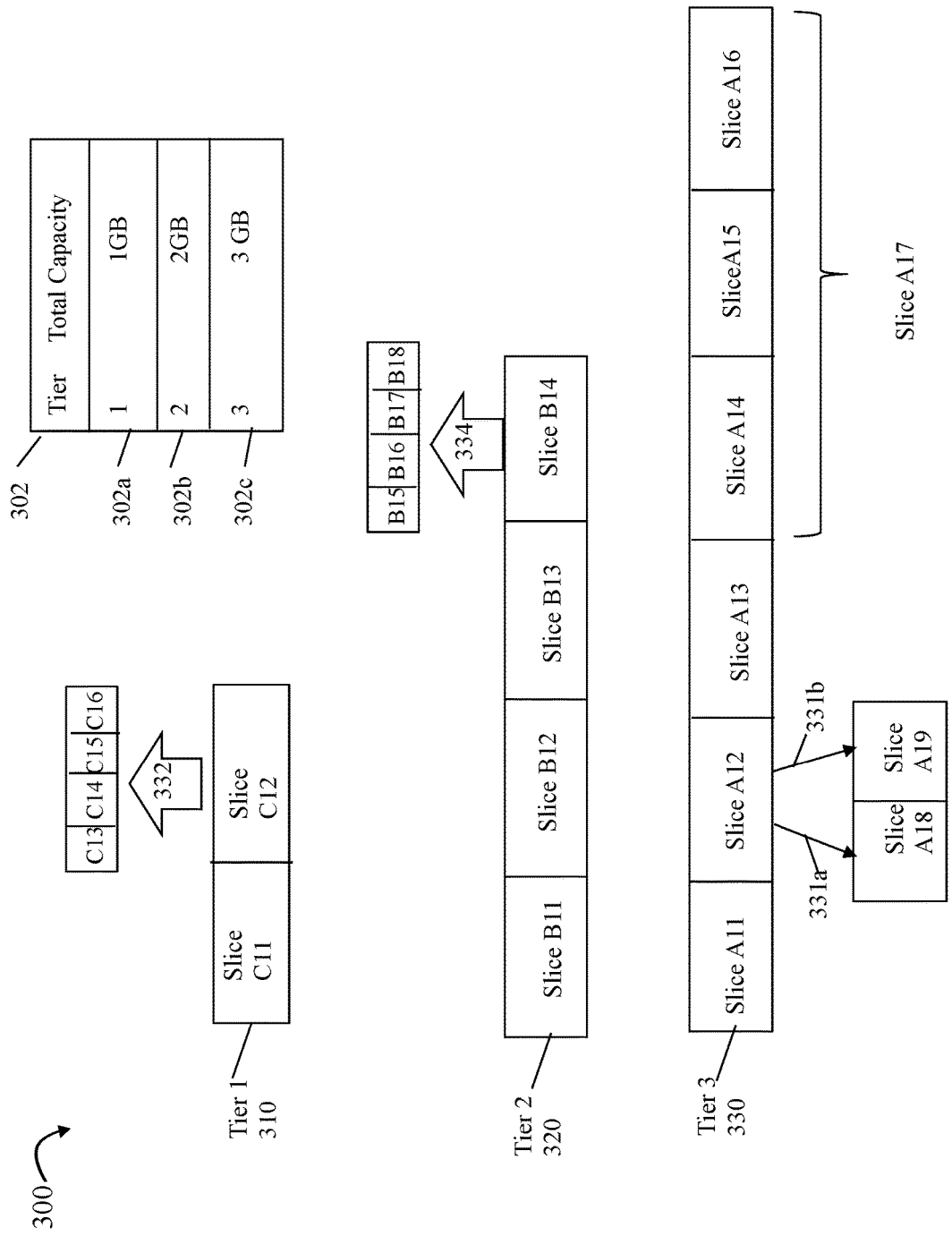
Figure 4B:
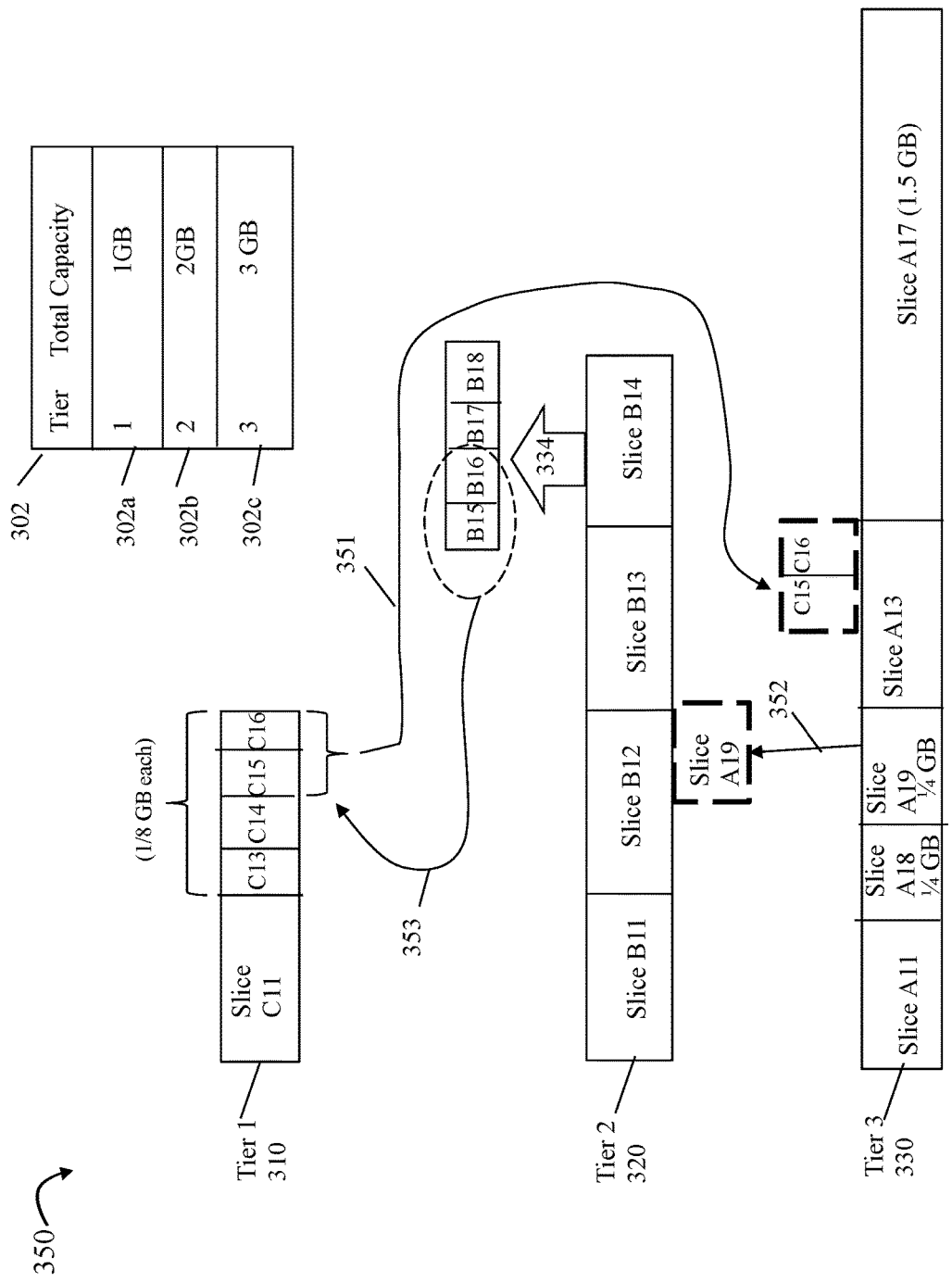

Referring to FIG. 4A, shown is another example illustrating use of the techniques herein in at least one embodiment. In the example 300, there are 3 storage tiers—tier 1 310, tier 2 320 and tier 3 330. The tiers of FIG. 4A may be as described above. The table 302 lists the different tiers and tier capacities. The row 302a indicates that tier 1 310 has a total capacity of 1 GB. The row 302b indicates that tier 2 320 has a total capacity of 2 GB. The row 302c indicates that tier 3 330 has a total capacity of 3 GB.

The example 300 may denote a start or initial state in which all slices of all the tiers are the same size, such as ½ GB. However, more generally, an embodiment may initially configure the 3 tiers to have any suitable size slices and may vary the initial slice sizes in each tier. For example, as an alternative to all slices initially being ½ GB as in FIG. 4A, an embodiment may partition the physical storage of the 3 tiers into the different slice sizes as denoted in the table 202. In this latter case, for example, tier 1 310 may be initially partitioned into 4 slices that are each ¼ GB; tier 2 320 may be initially partitioned into 4 slices that are each ½ GB; and tier 3 330 may be initially partitioned into 3 slices that are each 1 GB.

Different promotion thresholds may be associated with promoting a slice of data to tier 1 310 and tier 2 320. In at least one embodiment, in order for a slice to be promoted to tier 1 310, the slice's I/O workload or activity level must exceed a tier 1 promotion threshold level; and in order for a slice to be promoted to tier 2 320, the slice's I/O workload or activity level must exceed a tier 2 promotion threshold level, wherein the tier 1 promotion threshold>tier 2 promotion threshold.

Different demotion thresholds may be associated with demoting a slice of data to tier 2 320 and tier 3 330. In at least one embodiment, in order for a slice to be demoted to tier 2 320, the slice's I/O workload or activity level must fall below a tier 2 demotion threshold level; and in order for a slice to be demoted to tier 3 330, the slice's I/O workload or activity level must fall below a tier 3 demotion threshold level.

The foregoing promotion and demotion thresholds may be any suitable values and may be determined in any suitable manner.

At a first point in time T11, assume that statistics have been collected for each of the slices in the 3 tiers 310, 320 and 330 that include data. For example, assume that at least slices A12, A14, A15, A16, and C12 include data portions stored therein and statistics have been collected for each of these slices characterizing the I/O workload or activity of the slices.

The statistics for slice A12 may indicate that the I/O workload or activity level of slice A12 does not exceed the tier 2 promotion threshold but does exceed a split threshold level of activity indicating that A12 may be partitioned into multiple smaller slices. The split threshold level may be less than the tier 2 promotion threshold. In this case, slice A12 may be partitioned into 2 smaller target slices A18 and A19 located in the same tier, tier 3, as the source slice A12. The arrows 331a, 331b denote the partitioning of the slice A12 into the smaller slices A18 and A19 in the same tier 3. In this case, there may be no movement of data but rather a logical repartitioning of the source slice A12 into the 2 slices A18 and A19 thereby enabling collection of statistics for each of the smaller slices A18 and A19 individually. Such partitioning may be performed, for example, to allow for a further determination of whether the I/O workload or activity level of slice A12 is primarily directed to only a particular portion of A12 (e.g., only A18 or only A19). In this manner subsequent time periods and iterations of the techniques herein may be performed to further isolate and identify whether to promote A18 or A19 individually. In the example 300, the slices A18 and A19 may be the same size, each ¼ GB.

Also at the first point in time T11, the statistics of slices A14, A15 and A16 of tier 3 indicate that the I/O workload or activity level of each of A14, A15 and A16 fall below a minimum activity level threshold and may be characterized as very low activity or idle. In connection with the techniques herein, processing may be performed that combines the slices A14, A15 and A16 into a single larger slice A17 that is 1.5 GB. In this example, the resulting slice A17 is also in tier 3. Combining the idle or low activity slices in the lowest performance tier 3 330 into a single slice results in reducing the number of slices and thus reducing the number of per slice statistics collected and stored.

Also at the first point in time T11, the statistics for slice B14 indicate that B14 has an I/O workload or activity level exceeding the tier 1 promotion threshold. Thus B14 should be promoted to tier 1. However in this example there is no remaining capacity in tier 1 to allow the promotion of B14 from tier 2 to tier 1. As such, processing may be performed to more specifically identify smaller slices of tier 1 that may be demoted to a lower performance tier, and to also identify smaller sub-slices of slice B14 of tier 2 that may be promoted to tier 1. The statistics of the slice C12 may denote that C12 has a lower I/O workload or activity level than slice C11. The slice C12 may be selected for further partitioning into multiple smaller slices to facilitate identifying smaller portions of C12 that may be demoted. In this example, the slice C12 may be partitioned 332 into 4 smaller slices, C13, C14, C15 and C16, each of which are ⅛ GB. In a similar manner, the slice B14 may be partitioned into multiple smaller slices to facilitate identifying smaller portions of B14 that may be promoted. In this example, the slice B14 may be partitioned 334 into 4 smaller slices, B15, B16, B17 and B18, each of which are ⅛ GB.

Subsequent to the time T11, a second time period elapses and additional statistics are collected for the slices in the example 300. With reference now to FIG. 4B at the time T12 after the second time period has elapsed, statistics are collected for at least slices A17, A18 and A19 of tier 3; slices B15, B16, B17 and B18 of tier 2; and slices C13, C14, C15 and C16 of tier 1.

Based on the statistics collected, at the time T12 the I/O workload or activity levels of C15 and C16 are idle and the I/O workload or activity levels of C13 and C14 is very high. The foregoing difference in I/O workload or activity levels among C13-C16 is identified based on the partitioning of the prior slice B14. In this case, slices C15 and C16 of tier 1 are demoted 351 to tier 3 and stored in slice A13 of tier 3. Since the I/O workload or activity levels of both C15 and C16 are idle and also similar to the idle I/O workload or activity level of slice A17, the data of slices C15 and C16 that is relocated to slice A13 may be further combined with the slice A17.

Based on the statistics collected, at the time T12 the I/O workload or activity level of the slice A19 exceeds the tier 2 promotion threshold and is promoted 352 to tier 2. In this example, the data of the slice A19 of tier 3 may be relocated to the slice B12 of tier 2.

Based on the statistics collected, at the time T12 the I/O workload or activity levels of each of the slices B15 and B16 exceeds the tier 1 promotion threshold. As a result, the data of the slices B15 and 16 may be promoted 353 to tier 1. In this example, the data of the slices B15 and B16 is relocated to slices C15, C16 of tier 1.

Figure 4C:
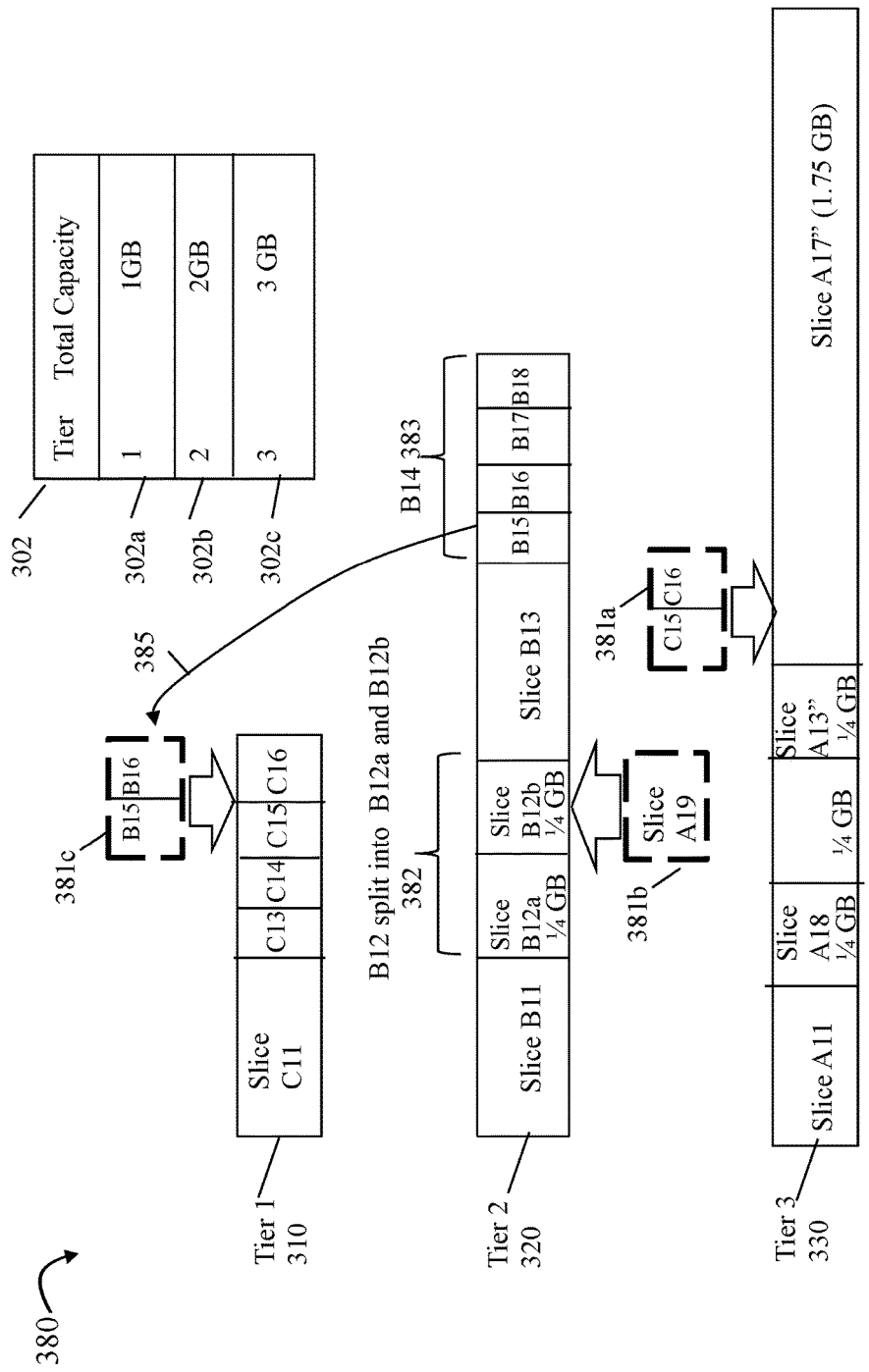

Referring to FIG. 4C, shown is an example 380 illustrating the state of the storage tiers after time T12 after completing the promotions, demotions and combining slices described above in connection with FIG. 4B. In the example 380, data 381a formerly stored in the slices C15, C16 of tier 1 is relocated to tier 3 and incorporated into the slice A17" having a size of 1.75 GB. The slice A17" denotes the result of combining the prior slice A17 (1.5 GB in size) with the relocated data (381a) previously stored on the slices C15 and C16 of tier 1. The data 381b of the slice A19 in tier 3 has been promoted to slice B12b of tier 2. In this example, the former slice B12 of tier 2 has been partitioned into 2 smaller slices B12a and B12b, each of which is ¼ GB. The data 381c of the slices B15 and B16 of the former slice B14 383 is relocated 385 from tier 2 to the slices C15 and C16 in tier 1.

It should be noted that although the examples illustrated in connection with FIGS. 4A, 4B and 4C did not partition a source slice into multiple smaller slices of a target tier as part of promotion processing, an embodiment may also further partition the source slice in multiple smaller slices of the higher performance target tier as part of promotion processing.

Additionally, although the examples illustrated in connection with FIGS. 4A, 4B and 4C did not combine multiple source slices of a source tier into a single larger slice of a lower performance target tier as part of demotion processing, an embodiment may also combine multiple source slices of a source tier into a single larger slice of a lower performance tier as part of demotion processing.

Referring to FIG. 5, shown is an example illustrating statistics that may be collected for slices in an embodiment in accordance with the techniques herein. The table 400 includes columns of statistics collected for the different slices uniquely identified by slices IDs (identifiers) in the column 402. Each row of the table 400 includes statistics collected for a single slice. Each slice in the system may have a unique corresponding slice ID. In this example, the statistics 404 may include a first statistic 406 denoting the write I/O activity directed to a slice and a second statistic 408 denoting the read I/O activity directed to a slice. For example, the first statistic 406 denoting the write I/O activity may be a number of write I/Os per second directed to a slice associated with a particular row; and the second statistic 408 denoting the read I/O activity may be a number of read I/Os per second directed to a slice associated with a particular row.

Consistent with discussion herein, an embodiment may generally include any suitable statistics for use in connection with the techniques herein. The particular statistics of the table 400 of FIG. 5 are non-limiting examples provided for illustration purposes. In at least one embodiment, the table 400 may be stored in the cache or another form of fast memory or storage.

During each time period when statistics are collected, the table 400 may be updated as I/Os that are directed to the logical addresses mapped to the slices are received by the data storage system. At the end of a time period, the collected statistics may be used, for example, by a data storage optimizer to identify on what tiers to place the data portions stored at various logical addresses. In particular the data portions may be currently stored on slices of the storage tiers and the data storage optimizer may perform processing to determine whether to perform any data movements such as to promote or demote data of any of the slices. In connection with any data movements for promotions or demotions, the mapping information 104 of FIG. 2 may be accordingly updated. For example, a first data portion may be stored at a first logical address that is mapped to a first slice in tier 3. The first data portion may be promoted to tier 2 by relocating the first data portion from the first slice of tier 3 to a second slice of tier 2. In this case, the mapping information 104 (denoting the logical address to physical storage location mapping) may be accordingly updated to indicate that the first logical address's data is now stored on the second slice of tier 2. The processing performed by the data storage optimizer may also include determining whether to combine slices of a first tier into a larger slice in the same first tier or another tier. The processing performed by the data storage optimizer may also include determining whether to combine slices of a first tier into a larger slice that is located in the same first tier or another tier. The processing may also include determining whether to partition a single slice of a first tier into multiple smaller slices that are located in the same first tier or another tier.

In connection with the embodiments described herein, any suitable number of smaller source slices may be combined into a single resulting target slice. Any suitable criteria may be used to select the particular source slices that are combined. In at least one embodiment, the source slices combined may be characterized as having similar I/O workload or activity based on one or more aspects thereof. For example, the I/O workload or activity of the source slices may be characterized based on the type of I/O workload as well as the activity level of each type of I/O workload. For example, I/O workload may include read I/O workload and write I/O workload. The read I/O workload or write I/O workload may be characterized as heavy or high, such as above a specified threshold level. Thus, a write heavy workload may denote a write I/O workload exceeding a specified threshold activity level; and a read heavy workload may denote a read I/O workload exceeding a specified threshold activity level. In at least one embodiment, slices may be combined if they are all write heavy, if they are all read heavy, or if they all have an idle activity level. In at least one embodiment, slices may be combined if they have similar read/write mixtures (e.g., similar ratios of read operations/write operations, similar percentage of read operations, similar percentage of write operations). In such cases, similar read/write mixtures may refer to slices having ratios of read operations/write operations that are similar, such as within a specified tolerance or difference.

In at least one embodiment including multiple SSD tiers, characteristics of the I/O workload may be used in selecting a particular SSD tier for a slice having a sufficiently high enough workload to be placed in an SSD tier. Consider an embodiment having two SSD tiers—SSD tier1 including MLC PDs and SSD tier 2 including SLC PDs. As discussed above, generally, MLC PDs may not be preferred for write heavy I/O workloads and may be preferred for read heavy I/O workloads. SLC PDs may be preferred for either read heavy or write heavy I/O workloads. In such an embodiment, I/O workload characteristics of a slice of data may denote whether the slice's workload is read heavy or write heavy. For a slice having a write heavy workload, it may be preferred to place the slice of data in the SSD tier 2 rather than the SSD tier 1. For a slice having a read heavy workload, the slice of data may be placed on a slice in either the SSD tier 1 or SSD tier 2. Thus, a particular tier may be selected for placement of a slice of data based on a match between a workload preference of the particular tier's PDs and the slice's workload characteristic of read heavy or write heavy.

In at least one embodiment, different storage tiers may include PDs configured into different RAID group levels. For example, an embodiment may include 2 SSD tiers of flash drives where SSD tier 1 includes PDs configured as RAID-5 groups and SSD tier 2 includes PDs configured as RAID-6 groups. In such an embodiment, the I/O workload characteristics of a slice of data may be used in determining whether to locate the slice in the SSD tier 1 or the SSD tier 2. For example, if the slice of data is write heavy, the slice may be located in the SSD tier 1 to reduce the additional write penalty incurred with RAID-6 as opposed to RAID-5. If the slice of data is read heavy, the slice may be located in either the SSD tier 1 or the SSD tier 2.

Figure 6:
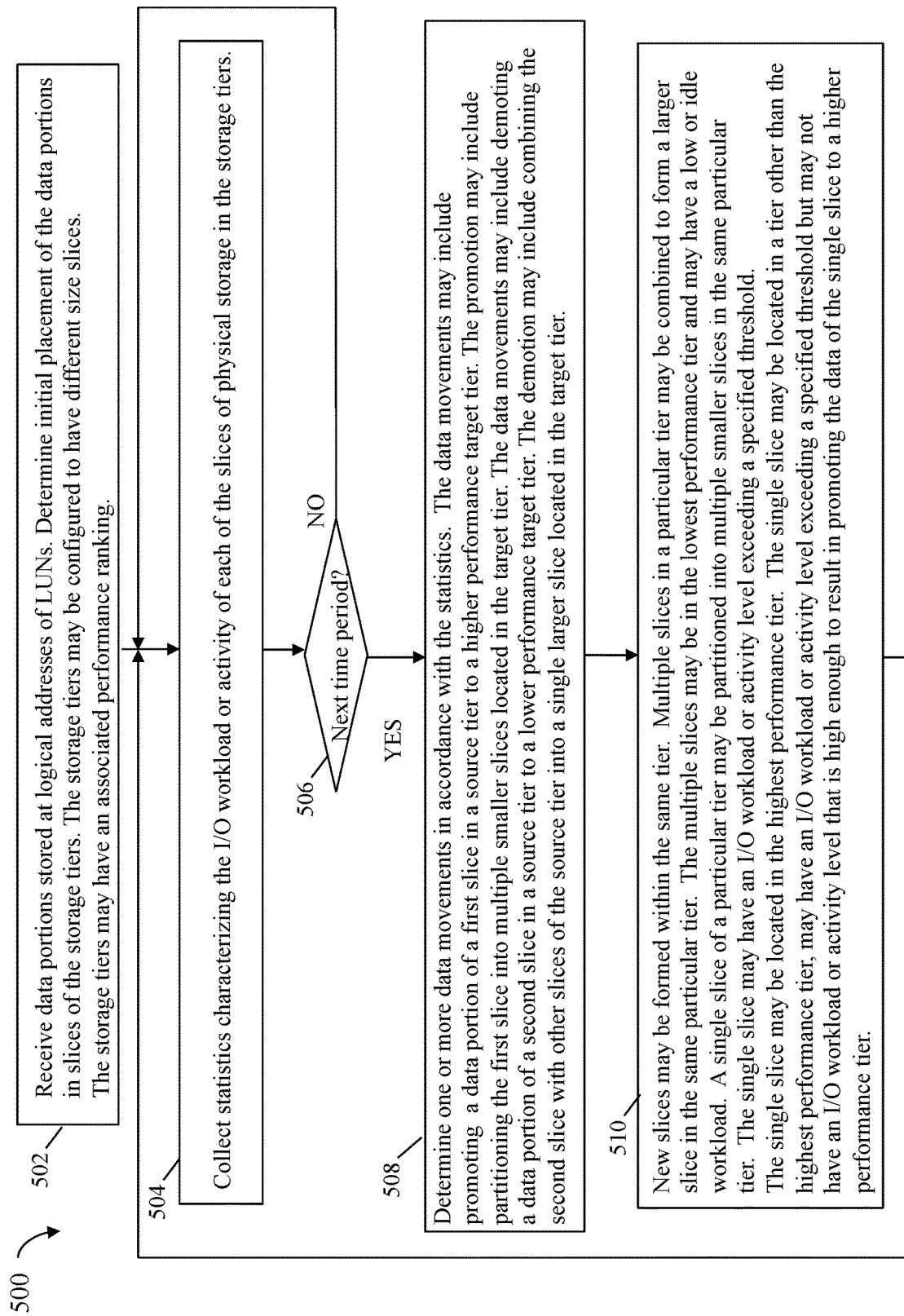
FIG. 6 is a flowchart of processing steps that may be performed in an embodiment in accordance with the techniques herein.

Referring to FIG. 6, shown is a flowchart 500 of processing steps that may be performed in an embodiment in accordance with the techniques herein. The flowchart 500 summarizes processing described above.

At the step 502, data portions stored at logical addresses of LUNs are received. The initial placement of the data portions on slices of the storage tiers is determined. The storage tiers may have an associated performance ranking. The storage tiers may be configured to have different size slices. In at least one embodiment, slices of the same storage tier are all the same size. In at least one alternative embodiment, slices within the same storage tier may be different sizes. Generally, any suitable technique may be used to select an initial placement of the data portions on slices in the storage tiers. As I/O workload or activity information is collected for the slices over time in subsequent processing steps, the data of a slice in one tier may be relocated as needed to another slice in another tier. From the step 502, control proceeds to the step 504.

At the step 504, processing is performed to collected one or more statistics characterizing the I/O workload or activity of the data of each of the slices of physical storage in the storage tiers. From the step 504, control proceeds to the step 506. At the step 506, a determination is made as to whether the next time period has elapsed. If the step 506 evaluates to no, control returns to the step 504 to continue to collect statistics until the step 506 evaluates to yes. If the step 506 evaluates to yes, control proceeds to the step 508.

At the step 508, processing is performed to determine one or more data movements in accordance with the statistics collected. The data movements may be subsequently implemented. The data movements may include promoting a data portion of a first slice in a source tier to a higher performance target tier. The promotion may include partitioning the first slice into multiple smaller slices located in the target tier. The data movements may include demoting a data portion of a second slice in a source tier to a lower performance target tier. The demotion may include combining the second slice with other slices of the source tier into a single larger slice located in the target tier. From the step 508, control proceeds to the step 510.

At the step 510, new slices may be formed within the same tier. Multiple slices in a particular tier may be combined to form a larger slice in the same particular tier. The multiple slices may be, for example, in the lowest performance tier and may have a low or idle workload. A single slice of a particular tier may be partitioned into multiple smaller slices in the same particular tier. The single slice may have an I/O workload or activity level exceeding a specified threshold. The single slice may be located in the highest performance tier. The single slice may be located in a tier other than the highest performance tier, may have an I/O workload or activity level exceeding a specified threshold but may not have an I/O workload or activity level that is high enough to result in promoting the data of the single slice to a higher performance tier. From the step 510, control returns to the step 504.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of data placement comprising:
   receiving a plurality of data portions stored at a plurality of logical addresses; and
   storing the plurality of data portions on a plurality of slices of physical storage located in a plurality of storage tiers of non-volatile physical storage devices, wherein the plurality of slices include a first slice of a first storage tier of the plurality of storage tiers and a second slice of a second storage tier of the plurality of storage tiers, wherein the second storage tier is different than the first storage tier and wherein the first slice is a first size and the second slice is a second size that is different than the first size, wherein each of a first plurality of slices, in the first storage tier, is the first size, and each of a second plurality of slices, in the second storage tier, is the second size, and wherein a first data movement includes relocating a first data portion from the first slice of the first storage tier to the second slice of the second storage tier.

2. The method of claim 1, further comprising:
   receiving a plurality of I/O operations directed to the plurality of slices located in the plurality of storage tiers;
   determining, in accordance with the plurality of I/O operations, a plurality of sets of one or more I/O workload statistics of the plurality of slices, wherein each of the plurality of slices has an I/O workload characterized by a corresponding one of the plurality of sets of one or more I/O workload statistics; and
   determining, in accordance with the plurality of sets of one or more I/O workload statistics, the first data movement for of the first data portion of the plurality of data portions wherein the first data portion is stored on the first slice of the first storage tier.

3. The method of claim 2, wherein the first data movement includes demoting the first data portion from the first slice of the first storage tier to the second slice of the second storage tier, and wherein the first storage tier is a higher performance storage tier than the second storage tier.

4. The method of claim 3, further comprising:
   combining the first data portion of the first slice with one or more additional data portions stored on one or more additional slices of the first storage tier; and
   relocating, to the second slice of the second storage tier, the first data portion of the first slice and the one or more additional data portions of the one or more additional slices of the first storage tier, wherein the second size of the second slice is larger than the first size of the first slice.

5. The method of claim 4, wherein the second size of the second slice is equal to a sum of the first size of the first slice and a size of each of the one or more additional slices.

6. The method of claim 2, wherein the first data movement includes promoting the first data portion from the first slice of the first storage tier to the second slice of the second storage tier, and wherein the first storage tier is a lower performance storage tier than the second storage tier.

7. The method of claim 1, the method further comprises:
   forming a new slice in the first storage tier by combining the first slice of the first storage tier with one or more additional slices of the first storage tier, wherein a size of the new slice is equal to a sum of the first size of the first slice and one or more corresponding sizes of the one or more additional slices.

8. The method of claim 7, wherein the first storage tier is a lowest performance tier of the plurality of storage tiers, and wherein I/O workloads of the first slice and the one or more additional slices are below a specified minimum threshold.

9. The method of claim 1, wherein the method further comprises:
   repartitioning the first slice into a third plurality of slices of the first storage tier, wherein each of the third plurality of slices has an associated size that is less than the first size of the first slice.

10. The method of claim 9, wherein the first storage tier is a highest performance tier of the plurality of storage tiers.

11. The method of claim 1, wherein for each of the plurality of storage tiers ranked higher in performance ranking than another one of the plurality of storage tiers, said each storage tier has a smaller slice size than another slice size of the another one of the plurality of storage tiers, and wherein each slice in said each storage tier is the smaller slice size and each slice in the another one of the plurality of storage tiers is the another slice size.

12. A method of data placement comprising:
receiving a plurality of data portions stored at a plurality of logical addresses; and
storing the plurality of data portions on a plurality of slices located in a plurality of storage tiers of non-volatile physical storage devices, wherein the plurality of slices include a first slice of a first storage tier of the plurality of storage tiers and a second slice of a second storage tier of the plurality of storage tiers, wherein the second storage tier is different than the first storage tier and wherein the first slice is a first size and the second slice is a second size that is different than the first size, wherein a first data movement includes relocating a first data portion from the first slice of the first storage tier to the second storage tier, wherein the first data movement includes promoting the first data portion from the first slice of the first storage tier to the second storage tier, and wherein the first storage tier is a lower performance storage tier than the second storage tier, and wherein said promoting includes:
partitioning the first data portion of the first slice into a plurality of data partitions; and
relocating each of the plurality of data partitions into a different one of a second plurality of slices in the second storage tier, wherein a size of each slice in the second plurality of slices is smaller than the first size of the first slice.

13. The method of claim 12, wherein each slice in the second plurality of slices is a same size.

14. The method of claim 13, wherein a sum of sizes of the second plurality of slices is equal to the first size of the first slice.

15. A system comprising:
one or more processors; and
one or more memories comprising code stored thereon that, when executed, performs a method of data placement comprising:
receiving a plurality of data portions stored at a plurality of logical addresses; and
storing the plurality of data portions on a plurality of slices located in a plurality of storage tiers of non-volatile physical storage devices, wherein the plurality of slices include a first slice of a first storage tier of the plurality of storage tiers and a second slice of a second storage tier of the plurality of storage tiers, wherein the second storage tier is different than the first storage tier and wherein the first slice is a first size and the second slice is a second size that is different than the first size, wherein each of first plurality of slices, in the first storage tier, is the first size, and each of second plurality of slices, in the second storage tier, is the second size, and wherein a first data movement includes relocating a first data portion from the first slice of the first storage tier to the second slice of the second storage tier.

16. A non-transitory computer readable medium comprising code stored thereon that, when executed, performs a method of data placement comprising:
receiving a plurality of data portions stored at a plurality of logical addresses; and
storing the plurality of data portions on a plurality of slices located in a plurality of storage tiers of non-volatile physical storage devices, wherein the plurality of slices include a first slice of a first storage tier of the plurality of storage tiers and a second slice of a second storage tier of the plurality of storage tiers, wherein the second storage tier is different than the first storage tier and wherein the first slice is a first size and the second slice is a second size that is different than the first size, wherein each of first plurality of slices, in the first storage tier, is the first size, and each of second plurality of slices, in the second storage tier, is the second size, and wherein a first data movement includes relocating a first data portion from the first slice of the first storage tier to the second slice of the second storage tier.

17. A non-transitory computer readable medium comprising code stored thereon that, when executed, performs a method of data placement comprising:
receiving a plurality of data portions stored at a plurality of logical addresses; and
storing the plurality of data portions on a plurality of slices located in a plurality of storage tiers of non-volatile physical storage devices, wherein the plurality of slices include a first slice of a first storage tier of the plurality of storage tiers and a second slice of a second storage tier of the plurality of storage tiers, wherein the second storage tier is different than the first storage tier and wherein the first slice is a first size and the second slice is a second size that is different than the first size, wherein a first data movement includes relocating a first data portion from the first slice of the first storage tier to the second storage tier, wherein the first data movement includes promoting the first data portion from the first slice of the first storage tier to the second storage tier, and wherein the first storage tier is a lower performance storage tier than the second storage tier, and wherein said promoting includes:
partitioning the first data portion of the first slice into a plurality of data partitions; and
relocating each of the plurality of data partitions into a different one of a second plurality of slices in the second storage tier, wherein a size of each slice in the second plurality of slices is smaller than the first size of the first slice.

18. A system comprising:
one or more processors; and
one or more memories comprising code stored thereon that, when executed, performs a method of data placement comprising:
receiving a plurality of data portions stored at a plurality of logical addresses; and
storing the plurality of data portions on a plurality of slices located in a plurality of storage tiers of non-volatile physical storage devices, wherein the plurality of slices include a first slice of a first storage tier of the plurality of storage tiers and a second slice of a second storage tier of the plurality of storage tiers, wherein the second storage tier is different than the first storage tier and wherein the first slice is a first size and the second slice is a second size that is different than the first size, wherein a first data movement includes relocating a first data portion from the first slice of the first storage tier to the second storage tier, wherein the first data movement includes promoting the first data portion from the first slice of the first storage tier to the second storage tier, and wherein the first storage tier is a lower performance storage tier than the second storage tier, and wherein said promoting includes:

partitioning the first data portion of the first slice into a plurality of data partitions; and relocating each of the plurality of data partitions into a different one of a second plurality of slices in the second storage tier, wherein a size of each slice in the second plurality of slices is smaller than the first size of the first slice.

* * * * *